(12) United States Patent
Fujiwara et al.

(10) Patent No.: US 7,670,974 B2
(45) Date of Patent: Mar. 2, 2010

(54) OPTICAL GLASS, PRESS MOLDING PREFORM, METHOD OF MANUFACTURING SAME, OPTICAL ELEMENT, AND METHOD OF MANUFACTURING SAME

(75) Inventors: Yasuhiro Fujiwara, Akishima (JP); Xuelu Zou, Akishima (JP)

(73) Assignee: Hoya Corporation, Tokyo (JP)

( * ) Notice: Subject to any disclaimer, the term of this patent is extended or adjusted under 35 U.S.C. 154(b) by 1451 days.

(21) Appl. No.: 10/825,316

(22) Filed: Apr. 16, 2004

(65) Prior Publication Data
US 2004/0259714 A1 Dec. 23, 2004

(30) Foreign Application Priority Data
Apr. 18, 2003 (JP) ............... 2003-114017

(51) Int. Cl.
C03C 3/16 (2006.01)
C03C 3/19 (2006.01)
C03C 3/17 (2006.01)
C03B 11/00 (2006.01)

(52) U.S. Cl. ............... 501/45; 501/46; 501/47; 501/48; 65/64

(58) Field of Classification Search ............... 501/45, 501/46, 47, 48; 65/64
See application file for complete search history.

(56) References Cited

U.S. PATENT DOCUMENTS

| | | | |
|---|---|---|---|
| 3,751,272 A | 8/1973 | Izumitani et al. | |
| 3,798,041 A | 3/1974 | Izumitani et al. | |
| 3,979,322 A * | 9/1976 | Alexeev et al. | ....... 252/301.6 P |
| 4,248,732 A * | 2/1981 | Myers et al. | .......... 252/301.6 P |
| 4,303,298 A * | 12/1981 | Yamashita | .................. 252/587 |
| 4,376,168 A * | 3/1983 | Takami et al. | .................. 501/1 |
| 4,391,915 A | 7/1983 | Meden-Piesslinger et al. | |
| 4,875,920 A * | 10/1989 | Myers | ....................... 65/30.14 |
| 4,962,067 A * | 10/1990 | Myers | ......................... 501/45 |

(Continued)

FOREIGN PATENT DOCUMENTS

DE 41 28 676 C1 3/1993

(Continued)

OTHER PUBLICATIONS

Machine Translation of JP 11-199269. Jul. 27, 1999.*

Primary Examiner—Karl E Group
Assistant Examiner—Elizabeth A Bolden
(74) Attorney, Agent, or Firm—Sughrue Mion, PLLC

(57) ABSTRACT

A low dispersion optical glass comprising, given as molar percentages, 28 to 50 percent of $P_2O_5$; more than 20 percent but not more than 50 percent of BaO; 1 to 20 percent MgO; a sum of $Li_2O$, $Na_2O$, and $K_2O$ exceeding 3 percent (with 0 to 25 percent of $Li_2O$, greater than or equal to 0 percent and less than 10 percent of $Na_2O$, and 0 to 12 percent of $K_2O$); more than 0 percent but not more than 15 percent of ZnO; 0 to 25 percent of $B_2O_3$; 0 to 5 percent of $Al_2O_3$; 0 to 8 percent of $Gd_2O_3$; 0 to 20 percent of CaO; 0 to 15 percent of SrO; and 0 to 1 percent of $Sb_2O_3$; with a sum of oxide contents of P, Ba, Mg, Li, Na, K, Zn, B, Al, Gd, Ca, Sr, and Sb being greater than or equal to 98 percent. The optical glass comprises no $La_2O_3$. The press molding preform is comprised of the optical glass.

13 Claims, 1 Drawing Sheet

U.S. PATENT DOCUMENTS

| | | | | |
|---|---|---|---|---|
| 5,053,360 A | * | 10/1991 | Myers | 501/48 |
| 5,153,151 A | * | 10/1992 | Aitken | 501/45 |
| 5,164,343 A | * | 11/1992 | Myers | 501/48 |
| 5,668,066 A | * | 9/1997 | Oguma et al. | 501/45 |
| 6,225,244 B1 | * | 5/2001 | Oguma | 501/45 |
| 6,228,787 B1 | * | 5/2001 | Pavel | 501/13 |
| 6,355,586 B1 | * | 3/2002 | Usui et al. | 501/45 |
| 6,784,128 B2 | * | 8/2004 | Otsuka et al. | 501/48 |
| 7,157,391 B2 | * | 1/2007 | Kasuga et al. | 501/45 |

FOREIGN PATENT DOCUMENTS

| | | |
|---|---|---|
| EP | 1 468 974 A | 10/2004 |
| EP | 1 477 463 A | 11/2004 |
| JP | 60 122749 A | 7/1985 |
| JP | 60-122749 A | 7/1985 |
| JP | 63-20775 A | 4/1988 |
| JP | 11-199269 A | 7/1999 |
| JP | 11-217234 A | 8/1999 |
| JP | 11-335132 A | 12/1999 |
| JP | 2000-034132 A | 2/2000 |
| JP | 2002 211949 A | 7/2002 |
| JP | 2004-262703 A | 9/2004 |

* cited by examiner

OPTICAL GLASS, PRESS MOLDING PREFORM, METHOD OF MANUFACTURING SAME, OPTICAL ELEMENT, AND METHOD OF MANUFACTURING SAME

FIELD OF THE INVENTION

The present invention relates to low-dispersion optical glass having a low glass-transition temperature suited to precision press molding, a press molding preform comprised of this glass, a method of manufacturing the same, an optical element, and a method of manufacturing the same.

BACKGROUND ART

There are numerous known low-dispersion optical glasses. The SK-type glass listed in the "Glass Databook" published by the Japan Glass Product Industrial Association, commercial PCD4 glass made by HOYA Corporation, and the like are known glasses. However, these glasses generally have glass-transition temperatures of 560° C. or greater and are not suited for use in precision press molding. In a precision press molding glass, a high press molding temperature is problematic in that it damages the surface of the pressing mold and decreases the durability of the mold material. Thus, the glass-transition temperature of the glass is desirably as low as possible. To solve this problem, glasses containing large quantities of alkali metal oxides such as $Li_2O$ have been proposed.

The $SiO_2$—$B_2O_3$—$SrO$—$Li_2O$ glass described in Japanese Patent No. 2872899 is one such example. However, since large amounts of $Li_2O$ are contained in the glasses described in the Patent, they have problems in the form of poor weatherability and in that the pressing mold employed during pressing tends to cloud. Japanese Patent No. 3150992 describes attempts to reduce the glass-transition temperature by incorporating alkalis and $TeO_2$ into prior art $SiO_2$—$B_2O_3$—$BaO$ glass. However, the incorporation of alkalis and $TeO_2$ results in substantial deterioration of chemical durability, rendering the glass unsuitable for high-precision molding.

The present invention, devised to solve the above-stated problems, has for its objects to provide a low-dispersion optical glass with a low glass-transition temperature and good weatherability; a press molding preform comprised of this optical glass; a method of manufacturing the same; an optical element comprised of this optical glass; and a method of manufacturing the same.

SUMMARY OF THE INVENTION

The invention solving the above-stated problems is an optical glass comprising, given as molar percentages, 28 to 50 percent of $P_2O_5$;
more than 20 percent but not more than 50 percent of BaO;
1 to 20 percent MgO;
a sum of $Li_2O$, $Na_2O$, and $K_2O$ exceeding 3 percent (with 0 to 25 percent of $Li_2O$, greater than or equal to 0 percent and less than 10 percent of $Na_2O$, and 0 to 12 percent of $K_2O$);
more than 0 percent but not more than 15 percent of ZnO;
0 to 25 percent of $B_2O_3$;
0 to 5 percent of $Al_2O_3$;
0 to 8 percent of $Gd_2O_3$;
0 to 20 percent of CaO;
0 to 15 percent of SrO; and
0 to 1 percent of $Sb_2O_3$;

with a sum of oxide contents of P, Ba, Mg, Li, Na, K, Zn, B, Al, Gd, Ca, Sr, and Sb being greater than or equal to 98 percent.

In the above optical glass, it is preferred that the BaO content exceeds 42 weight percent; or the content of BaO is less than or equal to 42 weight percent and the weight ratio of $P_2O_5$ to BaO ($P_2O_5$/BaO) is less than 1.0.

In the above optical glass, it is preferred that the ZnO content exceeds 1 weight percent; or the ZnO content is less than or equal to 1 weight percent and a sum of contents of $Li_2O$, $Na_2O$, and $K_2O$ exceeds 2 weight percent.

In the above optical glass, it is preferred the optical glass exhibits a refractive index (nd) of from 1.55 to 1.72 and an Abbé number (vd) of from 57 to 70.

The present invention further relates to a press molding preform comprised of the optical glass of the present invention.

The present invention still further relates to a method of manufacturing a press molding preform characterized in that a glass melt gob of prescribed weight is separated from a glass melt flow, and a press molding preform comprised of the optical glass of the present invention is formed with the prescribed weight.

The present invention also relates to an optical element comprised of the optical glass of the present invention.

The present invention further relates to a method of manufacturing an optical element characterized in that the above-mentioned press molding preform of the present invention or the press molding preform manufactured by the above-mentioned method of manufacturing according to the present invention is heated and precision press molded.

In the method of manufacturing an optical preform, it is preferred that the preform is introduced into a pressing mold, the pressing mold and preform are both heated, and the preform is precision press molded.

In the method of manufacturing an optical element, it is preferred that the pressing mold and preform are separately preheated and the preheated preform is introduced into the pressing mold and precision press molded.

Figure 1:
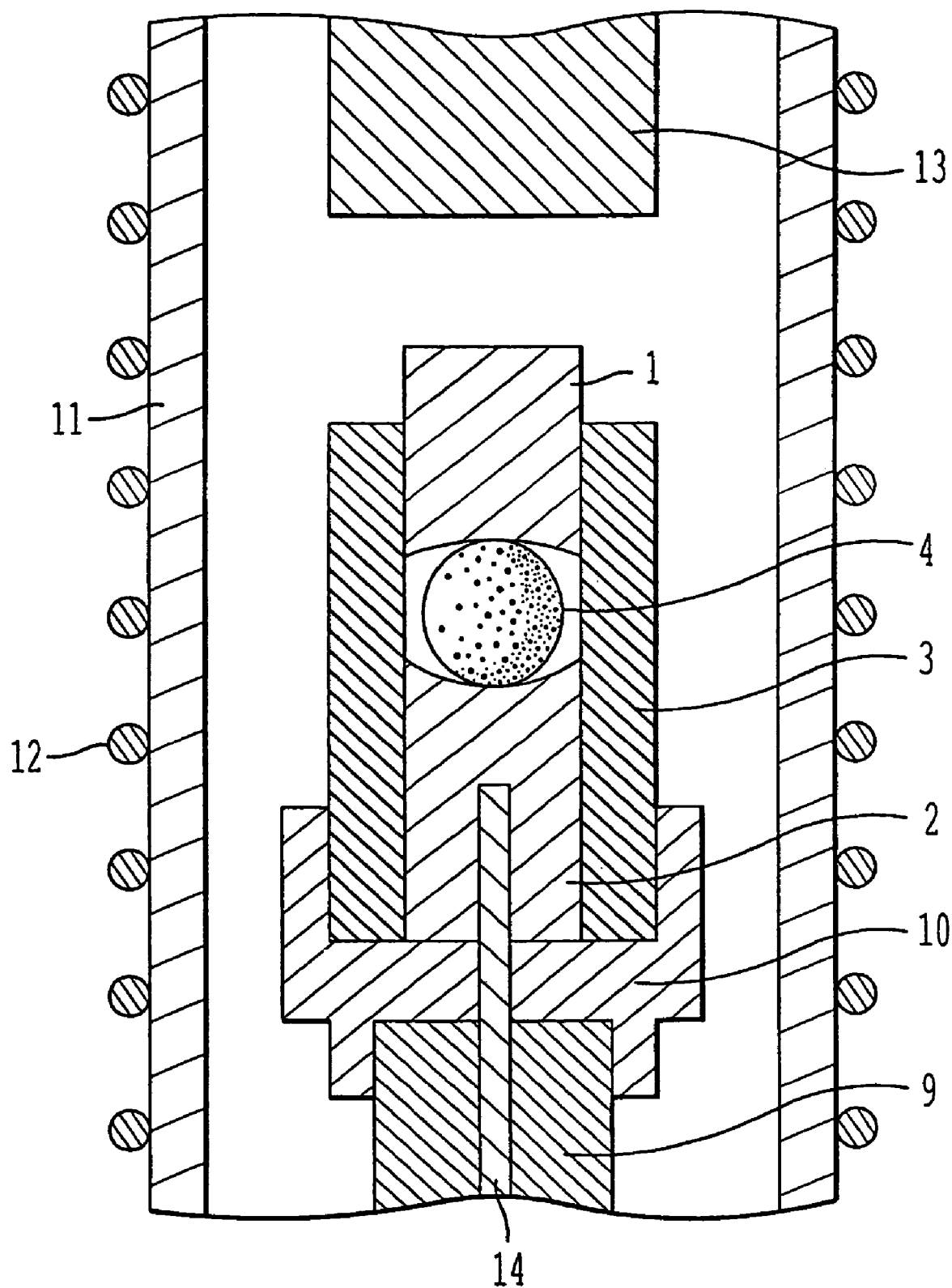
FIG. 1 is a schematic view of a pressing device for precision press molding of aspherical lenses.

The present inventors conducted extensive research into achieving the above-stated goals, resulting in the discovery that the glass-transition temperature could be greatly reduced while imparting high weatherability and high durability to the glass by incorporating a relatively large amount of BaO, an alkali metal oxide, and a relatively small amount of MgO and ZnO to a base in the form of a phosphate glass containing less than or equal to 50 molar percent of $P_2O_5$. They further discovered that the incorporation of a small amount of $B_2O_3$ greatly increased the weatherability of the glass. The present invention was devised based on these discoveries.

[The Optical Glass]

The optical glass of the present invention comprises, given as molar percentages, 28 to 50 percent of $P_2O_5$; more than 20 percent but not more than 50 percent of BaO; 1 to 20 percent MgO; a total of $Li_2O$, $Na_2O$, and $K_2O$ exceeding 3 percent (with 0 to 25 percent of $Li_2O$, greater than or equal to 0 percent and less than 10 percent of $Na_2O$, and 0 to 12 percent of $K_2O$); more than 0 percent but not more than 15 percent of ZnO; 0 to 25 percent of $B_2O_3$; 0 to 5 percent of $Al_2O_3$; 0 to 8 percent of $Gd_2O_3$; 0 to 20 percent of CaO; 0 to 15 percent of SrO; and 0 to 1 percent of $Sb_2O_3$; with the combined content of these components being greater than or equal to 98 percent.

The above composition can impart the following characteristics to the glass.

(1) The optical constants of a refractive index (nd) of 1.55 to 1.72 and an Abbé number (vd) of 57 to 70.

(2) the low-temperature softening property of a glass-transition temperature (Tg) of less than or equal to 550° C. or a sag temperature (Ts) of less than or equal to 600° C.

(3) Stability in the form of a glass liquid-phase temperature of less than or equal to 1,050° C.

(4) Weatherability in the form of a scattered light intensity/transmitted light intensity ratio of less than or equal to 4.0 percent when white light is transmitted through the polished surface of the glass after maintaining glass optically polished on both sides in a clean thermo-hygrostat at a temperature of 65° C. and a relative humidity of 90 percent for one week.

(5) Water resistance in the form of a weight reduction of less than 0.25 denoted as a percentage in a water resistance test in accordance with the standard of the Japan Optical Glass Industrial Association.

The optical glass of the present invention is suitable for use as a glass material in precision press molding. Precision press molding, also known as mold optics molding, is a method of press molding glass by press molding an optically functional surface without mechanical processing. The term "optically functional surface" as used herein means a surface that transmits, refracts, diffracts, or reflects light.

The role and content of each component of the optical glass of the present invention will be described next. Unless specifically stated otherwise, the contents of the various components are given as molar percentages.

$P_2O_5$ is a molding material forming the network structure of the glass, and is an essential component for imparting stability permitting manufacturing to the glass. However, when the $P_2O_5$ content exceeds 50 percent, the glass-transition temperature and sag temperature increase, and the refractive index and weatherability deteriorate. At less than 28 percent, the tendency of the glass to devitrify increases and the glass becomes unstable. Thus, the $P_2O_5$ content falls within a range of 28 to 50 percent, preferably a range of 30 to 45 percent.

BaO is an essential component for increasing the refractive index of the glass, increasing devitrification stability, and lowering the liquid-phase temperature. In particular, more than 20 percent of BaO must be incorporated to increase the weatherability of the glass. However, when the quantity of BaO exceeds 50 percent, not only does the glass become unstable, but the liquid-phase temperature, glass-transition temperature, and sag temperature of the glass all rise. Thus, the BaO content falls within a range of greater than 20 percent but not greater than 50 percent, preferably within a range of greater than 20 percent but not greater than 45 percent.

In order to increase the weatherability of the glass, it is possible to divide the $P_2O_5$ and BaO contents into two ranges. The first range is where the BaO content is greater than 42 weight percent, but less than or equal to 50 percent. Within this range, the incorporation of a rather large quantity of BaO ensures good weatherability. However, a glass with even better weatherability can be obtained by further incorporating a quantity of $P_2O_5$ falling within the above range of 28 to 50 percent. In the second range, the quantity of BaO is greater than 20 percent and less than or equal to 42 percent. Since there is less BaO in the second range than in the first range, the weatherability of the glass tends to decrease. Thus, the weight ratio of the quantity of $P_2O_5$ to the quantity of BaO ($P_2O_5$/BaO) is desirably set to less than 1.0 to improve the weatherability of the glass.

MgO is a component incorporated to improve the weatherability of the glass. The incorporation of a small quantity of MgO has the effect of lowering the glass-transition temperature, sag temperature, and liquid-phase temperature. However, the incorporation of a large amount results in marked deterioration of devitrification stability, with a risk of increasing the liquid-phase temperature. Accordingly, the quantity of MgO incorporated is set to 1 to 20 percent, preferably falling within the range of from 2 to 15 percent.

Alkali metal oxides are effective components for reducing the sag temperature of the glass. It is necessary for the combined amount of $Li_2O$, $Na_2O$, and $K_2O$ to exceed 3 percent. When the combined amount of $Li_2O$, $Na_2O$, and $K_2O$ is 3 percent or less, the sag temperature of the glass increases and there is a risk that precision press molding of the optical glass will be precluded. The combined amount of $Li_2O$, $Na_2O$, and $K_2O$ is desirably greater than or equal to 4 percent. To further increase weatherability, it is desirable for the combined quantity of $Li_2O$, $Na_2O$, and $K_2O$ to be less than or equal to 30 percent, preferably less than or equal to 25 percent.

$Li_2O$ is a component lowering the glass-transition temperature and sag temperature that is employed to reduce the press molding temperature when press molding optical elements. The incorporation of a small quantity of $Li_2O$ greatly reduces the glass-transition temperature. However, the incorporation of a large quantity causes deterioration of glass weatherability and stability and runs the risk of sharply reducing the refractive index. Thus, the quantity incorporated is from 0 to 25 percent, preferably falling within the range of from 1 to 20 percent.

Alkali metal oxides such as $Na_2O$ and $K_2O$ are components incorporated to increase the resistance of the glass to devitrification, lower the sag temperature and liquid-phase temperature, and improve the high-temperature melt property of the glass. The incorporation of suitably quantities of $Na_2O$ and $K_2O$ improves glass stability and lowers the liquid-phase temperature and glass-transition temperature. However, when 10 percent or more of $Na_2O$ or more than 12 percent of $K_2O$ is incorporated, not only does the stability of the glass deteriorate, but weatherability also deteriorates markedly. Accordingly, the quantity of $Na_2O$ incorporated is set to greater than or equal to 0 percent and less than 10 percent, preferably from 0 to 8 percent, and the quantity of $K_2O$ incorporated is set to from 0 to 12 percent. The preferred content of $K_2O$ is from 0 to 10 weight percent.

ZnO is an essential component of the optical glass of the present invention. The incorporation of a small quantity of ZnO greatly reduces the sag temperature of the glass and increases stability. However, the incorporation of a large amount of ZnO sharply reduces the Abbé number of the glass, and runs the risk of making it impossible to obtain the low-dispersion glass that is the object of the present invention. Thus, the quantity incorporated is set to within a range exceeding 0 percent but not exceeding 15 percent, desirably from 0.5 to 15 percent, and preferably from 1 to 8 percent.

The quantity of ZnO can be divided into two ranges to reduce the sag temperature of the glass and enhance suitability to precision press molding. The first range is a ZnO content exceeding 1 weight percent but not exceeding 15 percent. The second range is a ZnO content exceeding 0 percent but not exceeding 1 percent, with the combined quantity of $Li_2O$, $Na_2O$, and $K_2O$ exceeding 2 weight percent.

In the second range, the quantity of ZnO is smaller than in the first range, but the quantity of alkali metal oxides can then be correspondingly increased to decrease the sag temperature.

$B_2O_3$ is not an essential component in the glass of the present invention. However, it is a component that is extremely effective in improving the melt property of the glass and homogenizing the glass. In addition, the incorporation of a small quantity of $B_2O_3$ changes the bonding property of the OH groups within the glass, preventing the glass from foaming during pressing. However, the incorporation of more than 25 molar percent of $B_2O_3$ causes the weatherability and stability of the glass to deteriorate. Thus, the quantity incorporated is set to a range of from 0 to 25 percent, desirably a range of from 0 to 20 percent, and more desirably to a range exceeding 0 percent but not exceeding 20 percent.

Although $Al_2O_3$ is not an essential component of the glass of the present invention, it is employed as a component effectively enhancing the weatherability of the glass. However, the incorporation of a quantity exceeding 5 percent increases the glass-transition temperature and the sag temperature, compromises stability, causes the high-temperature melt property to deteriorate, and runs the risk of decreasing the refractive index. Accordingly, the quantity incorporated is set to less than or equal to 5 molar percent, preferably less than or equal to 4 molar percent.

$Gd_2O_3$ is employed in the present invention as a component capable of greatly improving the weatherability and refractive index of the glass. However, when the quantity incorporated exceeds 8 percent, the Abbé number of the glass decreases to 55 or below and there is a risk of deterioration in the stability of the glass. Accordingly, the quantity incorporated is limited to less than or equal to 8 percent, preferably less than or equal to 6 percent.

Bivalent components such as CaO and SrO are employed to improve the stability of the glass and lower the liquid-phase temperature. The quantity of CaO incorporated is set to from 0 to 20 percent and the quantity of SrO incorporated is set to from 0 to 15 percent. When the content of CaO or SrO exceeds the stated range, not only does the durability of the glass deteriorate, but there is also a risk of the refractive index dropping. The quantity of CaO incorporated is desirably less than 15 percent, preferably less than 12 percent. The quantity of SrO incorporated is desirably kept to less than 15 percent, preferably less than 13 percent. The combined quantity of CaO and SrO is desirably less than or equal to 20 percent, preferably less than or equal to 18 percent.

$Sb_2O_3$ is an effective clarifying agent. However, when added in a quantity exceeding 1 molar percent, the glass tends to foam during precision pressing. Thus, the quantity incorporated is limited to less than or equal to 1 molar percent.

The combined quantity of the above components is set to greater than or equal to 98 percent to achieve the object of the present invention of providing an optical glass with low dispersion, a low glass-transition temperature, and good weatherability. The combined quantity of the above components is desirably greater than or equal to 99 percent, preferably 100 percent.

The incorporation of components such as $SiO_2$, $Y_2O_3$, $ZrO_2$, $Ta_2O_5$, $Bi_2O_3$, $TeO_2$, $Nb_2O_5$, $WO_3$, and $TiO_2$ in a quantity of from 0 to 2 percent is possible to the extent that the goal of the present invention is not compromised.

However, $TeO_2$ is desirably not employed from the viewpoint of protecting the environment.

$Nb_2O_5$ is a component increasing the refractive index, but also having the effect of increasing dispersion. The optical glass of the present invention is characterized by having lower dispersion than other glasses having comparable refractive indexes. Accordingly, excess introduction of $Nb_2O_5$ results in loss of this dispersion characteristic. Thus, when employed, the quantity incorporated is desirably kept to less than 6 weight percent, preferably less than or equal to 3.5 weight percent. No incorporation is even more preferred.

Since $Y_2O_3$ and $Ta_2O_5$ are starting materials in scarce supply, they are desirably not incorporated from the perspectives of conserving resources and lowering cost.

The incorporation of a small quantity of $La_2O_3$ results in sharp deterioration of the stability of the glass, precluding the incorporation of BaO, an essential component of the present invention. Thus, this component is desirably not incorporated.

SnO is also desirably not incorporated because it sharply reduces the Abbé number of the glass.

Although fluorine may be incorporated, there is a risk of volatization during high-temperature molding of preforms. Thus, the quantity incorporated is desirably kept to less than 2 weight percent, with no incorporation being preferred.

PbO is a component that negatively affects the environment and causes clouding of the surface of the glass during precision press molding. Accordingly, it is desirably not incorporated.

Due to environmental considerations similar to those for PbO, Cd compounds and As compounds are desirably not incorporated.

Even more desirable composition ranges are given below: 30 to 45 percent of $P_2O_5$; more than 20 percent but not more than 45 percent of BaO; 2 to 15 percent MgO; a combined quantity of $Li_2O$, $Na_2O$, and $K_2O$ of greater than or equal to 4 percent (with 1 to 20 percent of $Li_2O$, 0 to 8 percent of $Na_2O$, and 0 to 12 percent of $K_2O$); 1 to 8 percent of ZnO; more than 0 percent but not more than 20 percent of $B_2O_3$; 0 to 4 percent of $Al_2O_3$; 0 to 6 percent of $Gd_2O_3$; more than 0 percent but less than 12 percent of CaO; and more than 0 percent but less than 13 percent of SrO (with the combined quantity of CaO and SrO not exceeding 20 percent), with the combined quantity of the above components plus $Sb_2O_3$ being greater than or equal to 98 percent, desirably greater than or equal to 99 percent, and preferably 100 percent.

Within the above ranges, it is preferable for the quantity of ZnO to be from 1 to 8 percent, $B_2O_3$ to be more than 0 percent but not more than 20 percent, $Al_2O_3$ to be from 0 to 4 percent, CaO to be less than 12 percent, SrO to be less than 13 percent, and the combined quantity of CaO and SrO to be not greater than 18 percent.

Within the composition ranges and desirable composition ranges of the present invention, the incorporation of more than 0 percent of each of $P_2O_5$, BaO, MgO, $Li_2O$, ZnO, $B_2O_3$, $Al_2O_3$, $Gd_2O_3$, CaO, and $Sb_2O_3$ or the incorporation of more than 0 percent of each of $P_2O_5$, BaO, MgO, $Li_2O$, ZnO, $B_2O_3$, $Al_2O_3$, CaO, and $Sb_2O_3$ with the combined quantity of these components being greater than or equal to 99 percent is desirable. A combined quantity of 100 percent is preferred.

[Method of Manufacturing the Optical Glass]

The above-described optical glass can be manufactured by heating and melting glass starting materials. For $P_2O_5$, starting materials in the form of $H_3PO_4$, metaphosphate, disphosphorus pentoxide, or the like may be suitably employed; for $B_2O_3$, starting materials in the form of $H_3BO_3$ and $B_2O_3$ may be suitably employed; and for other components, carbonates, nitrates, oxides, and the like may be suitably employed. These starting materials are weighed out in prescribed proportions and mixed to form a blended starting material. This is then heated to 1,000 to 1,250° C. in a melting furnace; melted, clarified, and stirred; and homogenized to obtain a homogenous glass melt containing no bubbles or unmelted matter. This glass melt is shaped and gradually cooled to obtain the optical glass of the present invention.

[Refractive index and Abbé Number]

The above glass of the present invention has a refractive index (nd) of from 1.55 to 1.72 and an Abbé number (vd) of from 57 to 70. The composition of the glass of the present invention can be suitably set within the above-stated ranges to satisfy these characteristics. The above ranges yield a glass with both a low dispersion characteristic and a relatively high refractive index. The Abbé number is preferably from 59 to 70.

[Glass-Transition Temperature and Sag Temperature]

In the above glass of the present invention, the glass-transition temperature (Tg) is less than or equal to 550° C., desirably less than or equal to 520° C., and preferably less than or equal to 500° C. The sag temperature (Ts) is less than or equal to 600° C., desirably less than or equal to 580° C., and preferably less than or equal to 550° C. Such low softening properties permit a relatively low temperature during precision press molding. In the glass of the present invention, the composition can be suitably set within the above-stated ranges to achieve such a glass-transition temperature (Tg) and sag temperature (Ts).

[Liquid-Phase Temperature]

One indicator of glass stability is the liquid-phase temperature. In the above glass, the liquid-phase temperature is less than or equal to 1,050° C., desirably less than or equal to 1,000° C., preferably less than or equal to 960° C., and more preferably less than or equal to 900° C. Because of such stability, it is possible to separate a glass melt gob of a size suited to a single preform from the glass melt, and form a press molding preform without devitrification while the glass is at an elevated temperature exceeding its melting point. In the glass of the present invention, it is possible to suitably set the composition within the above-stated ranges to achieve such a liquid-phase temperature.

[Weatherability]

The weatherability of the glass is evaluated as follows. A glass sample 3 mm in thickness having two smooth parallel surfaces that have been optically polished is first prepared. When a sample of adequate size, such as a small preform or an optical element, cannot be prepared, glass of the same composition may be employed. Here, the term "optically polished" means finished by polishing to about the surface roughness Ra of the optically functional surface of an optical element such as a lens. Specifically, a yardstick in the form of a polished state where the surface roughness Ra is substantially smaller than—for example, less than or equal to $1/10$—the wavelength on the short wavelength end of the visible light range can be adopted. A clean sample is employed. The sample is kept for one week in a thermo-hygrostat maintained at a temperature of 65° C. and a relative humidity of 90 percent. The atmosphere in the thermo-hygrostat is clean air. The air is desirably of a cleanliness of class of less than or equal to 1,000, preferably of a cleanliness of class of less than or equal to 100. Next, the incident light intensity of white light and the intensity of light transmitted through the sample when irradiated with white light (C light source or standard light C) in a direction perpendicular to the optically polished surfaces of the sample are measured after one week of storage. The intensity of scattered light is calculated by subtracting the intensity of transmitted light from the intensity of incident light, and the ratio of the intensity of scattered light to the intensity of transmitted light (scattered light intensity/transmitted light intensity) is calculated.

The ratio of the intensity of scattered light to the intensity of transmitted light thus measured is less than or equal to 4.0 percent in the optical glass of the present invention.

When an optical element is prepared from glass of low weatherability, water droplets and steam adhering to the surface and various chemical components such as gas in the use environment corrode the glass and produce foreign matter on the surface, reducing optical characteristics such as transmittance. Thus, weatherability, together with water resistance, described next, are important properties in obtaining highly reliable glass.

Particularly when manufacturing preforms for precision press molding, there is a substantial risk that foreign matter and corrosion present on the surface of the preform will remain on the optically functional surface of the optical element. Since no processing such as polishing of the optically functional surface is a premise of precision press molding, defective portions generated on the optically functional surface cannot be removed.

It is possible to avoid the above problem even when manufacturing optical elements by precision press molding, if employing glass imparted with good weatherability as phosphate glass in the manner set forth above.

[Water Resistance]

Phosphate glass of low softening properties sometimes presents the problem of reduced water resistance. The above glass of the present invention has good water resistance. Water resistance is measured as follows in the present invention.

A weight (measured in grams) corresponding to the specific gravity of the glass is rendered a powder with a particle size of about 425 to 600 micrometers. This powdered glass is weighed to obtain weight A. The powdered glass is then boiled for 60 min. in pure water and then weighed to obtain weight B. The index of water resistance is the value (Dw) denoted by the percentage obtained by subtracting weight B from weight A and then dividing by weight A.

In the above glass of the present invention, Dw is less than 0.25. The above method of evaluating water resistance is in conformity with the standard water resistance test of the Japan Optical Glass Industrial Association.

[Press Molding Preform and Method of Manufacturing Same]

A press molding preform and a method of manufacturing it will be described next. The press molding preform is a molded article of glass equal in weight to the press-molded product. The preform is molded into a shape based on the shape of the press-molded product. For example, the preform may be spherical, spheroidal, or the like in shape. The preform is heated to a viscosity permitting press molding and supplied to press molding.

The press molding preform of the present invention is comprised of the above optical glass. As necessary, a thin film such as a mold separation film may be provided on the surface. Since the preform can be press molded into an optical element having desired optical constants, and is comprised of glass of good weatherability and water resistance, the surface of the preform tends not to deteriorate during storage. In precision press molding, the molding surface of the pressing mold is precisely transferred to form an optically functional surface on the optical element without mechanical processing. When the surface of the preform supplied to precision press molding deteriorates and the optically functional surface is transferred to the deteriorated surface, the deteriorated portion cannot be removed by mechanical processing following precision press molding. Thus, the optical element becomes a defective product. However, the surface of the preform can be maintained in a good state to avoid this problem. Further, due to good weatherability and water resistance, the weatherability and water resistance of the optical element obtained by press molding, particularly precision press molding of the preform are both good, and it is possible to provide optical elements of high reliability over extended periods.

For example, the press molding preform of the present invention can be manufactured by separating a glass melt gob of prescribed weight from a glass melt flow and forming a preform of optical glass of the prescribed weight.

This method affords the advantages of not requiring mechanical processing such as cutting, grinding, or polishing. In mechanically processed preforms, distortion of the glass should be reduced, to the extent that the preform is not damaged, by annealing prior to mechanical processing. However, in the above method of manufacturing preforms, annealing to prevent distortion is unnecessary. Further, it is possible to shape preforms with smooth surfaces.

In the above method of manufacturing preforms, it is also desirable to form the preform while in a floating state by adding wind pressure to impart a smooth, clean surface. Further, preforms having surfaces comprised of free surfaces are desirable. Still further, preforms not having cutting scars called shear marks are desirable. When a shear mark remains at the stage of molding the precision press-molded article, that portion becomes a defect. Thus, it is desirable to eliminate shear marks at the preform stage. Methods of separating glass melt without shear marks and without using a cutting blade include the method of causing the glass melt to drip down from a flowpipe and the method of supporting the front end portion of the glass melt flow exiting a flowpipe and removing the support at a timing capable of separating a glass melt gob of prescribed weight (referred to hereinafter as the "drop-cut method"). In the drop-cut method, the glass is separated by a constriction formed between the front end portion side and the flowpipe side of the glass melt flow, making it possible to obtain a glass melt gob of prescribed weight. Next, the glass melt gob that has been obtained is molded into a suitable shape for feeding to press molding while in a softened state.

In the above method of manufacturing preforms, a glass melt gob corresponding to one preform is separated and the preform is formed while the glass gob is at a high temperature greater than or equal to the softening point of the glass. However, the glass melt may be caused to flow into a mold, a molded glass article may be molded out of the optical glass, and the molded glass article may be subjected to mechanical processing to obtain a preform of prescribed weight. Prior to mechanical processing, the glass is desirably annealed to adequately remove distortions.

[Optical Element and Method of Manufacturing Same]

The optical element of the present invention can be manufactured by heating and precision press molding a preform comprised of the above optical glass.

Since the glass constituting the optical element is optical glass having the various characteristics of the above-described glass, it is possible to utilize desired optical constants (a refractive index (nd) of from 1.55 to 1.72, an Abbé number (vd) of from 57 to 70) and good weatherability and water resistance to provide optical elements capable of affording high reliability for extended periods.

Examples of the optical element of the present invention are lenses such as spherical lenses, aspherical lenses, and microlenses; diffraction gratings; lenses with diffraction gratings; lens arrays; and prisms. The above optical element is desirably obtained by heat softening and precision press molding the above preform.

As necessary, thin optical films, such as antireflective films, fully-reflective films, partially-reflective films, and films having spectral characteristics, may also be provided on the optical element.

The method of manufacturing an optical element will be described next.

The method of manufacturing an optical element of the present invention is characterized in that a press molding preform comprised of the above optical glass or a press molding preform manufactured by the above manufacturing method is heated and precision press molded.

Precision press molding, also referred to as "mold optics molding," is already well-known in the technical field of the present invention.

A surface of the optical element that transmits, refracts, diffracts, or reflects light is called an optically functional surface. In the example of a lens, lens surfaces such as the aspherical surface of an aspherical lens and the spherical surface of a spherical lens correspond to optically functional surfaces. In precision press molding, the molding surface of the pressing mold is precisely transferred to the glass to form an optically functional surface by press molding. That is, there is no need for mechanical processing such as grinding or polishing to finish the optically functional surface.

Accordingly, the method of the present invention is suited to the manufacturing of optical elements such as lenses, lens arrays, diffraction gratings, and prisms, and is optimal for the highly efficient manufacturing of aspherical lenses in particular.

Since the method of manufacturing optical elements of the present invention permits the manufacturing of optical elements having the above optical characteristics and permits the press molding at relatively low temperature of preforms comprised of glass having a low glass-transition temperature (Tg), the load placed on the molding surface of the pressing mold is reduced and the service lifetime of the pressing mold is extended. Since the glass constituting the preform is highly stable, devitrification of the glass can be effectively prevented even during the pressing step. Further, a series of steps yielding final products from glass melt can be conducted with high production efficiency.

A known pressing mold may be employed in precision press molding, such as a pressing mold comprised of a mold material such as silicon carbide, a super-hard material, or stainless steel upon the molding surface of which is provided a mold separation film. A carbon-containing film, noble metal alloy film, or the like may be employed as the mold separation film. The pressing mold may be equipped with an upper and lower mold, and further equipped with a drum mold as needed.

In precision press molding, the atmosphere during molding is desirably a nonoxidizing gas to maintain the molding surface of the pressing mold in good condition. Preferred nonoxidizing gases are nitrogen and mixed gases of nitrogen and hydrogen.

A precision press molding method particularly suited to the method of manufacturing optical elements of the present invention will be described next.

(Precision Press Molding Method 1)

In this precision press molding method, a press molding preform is introduced into a pressing mold, both the pressing mold and preform are heated together, and precision press molding is conducted (referred to as "precision press molding method 1").

In precision press molding method 1, both the pressing mold and the preform are desirably heated to a temperature at which the glass constituting the preform exhibits a viscosity of from $10^6$ to $10^{12}$ dPa·sec (poise) and press molding is conducted.

Following cooling to a temperature at which the glass exhibits a viscosity of greater than or equal to $10^{12}$ dPa·sec, desirably greater than or equal to $10^{14}$ dPa·sec, and preferably greater than or equal to $10^{16}$ dPa·sec, the precision press molded article is desirably removed from the pressing mold.

Based on the above conditions, the shape of the molding surface of the pressing mold can be precisely transferred to the glass and the precision press molded article can be removed without deformation.

(Precision Press Molding Method 2)

In this precision press molding method, the pressing mold and press molding preform are separately preheated, the preheated preform is introduced into the pressing mold, and precision press molding is conducted (referred to as "precision press molding method 2").

Based on this method, since the preform is preheated before introduction into the pressing mold, the cycle period is shortened and optical elements of good surface precision can be manufactured without surface defects.

The temperature to which the pressing mold is preheated is desirably lower than the temperature to which the preform is preheated. Such preheating prevents lowering of the heating temperature of the pressing mold, permitting a reduction in wear and tear on the pressing mold.

In precision press molding method 2, the preform is desirably preheated to a temperature at which the glass constituting the preform exhibits a viscosity of less than or equal to $10^9$ dPa·sec, preferably $10^9$ dPa·sec.

Further, the preform is desirably preheated while being floated, preferably preheated to a temperature at which the glass constituting the preform exhibits a viscosity of from $10^{5.5}$ to $10^9$ dPa·sec, and more preferably a viscosity of greater than or equal to $10^{5.5}$ dPa·sec and less than $10^9$ dPa·sec.

Cooling of the glass is desirably begun simultaneously with the start of pressing or during pressing.

The temperature of the pressing mold is adjusted to lower than the preheating temperature of the preform; it suffices to employ a temperature at which the glass exhibits a viscosity of from $10^9$ to $10^{12}$ dPa·sec as a guide.

In the present invention, mold separation is desirably conducted after cooling to a temperature at which the glass viscosity is greater than or equal to $10^{12}$ dPa·sec.

Optical elements that have been precision press molded are removed from the pressing mold and, as needed, gradually cooled. When the molded product is an optical element such as a lens, a thin optical film may be coated on the surface as needed.

EMBODIMENTS

The present invention is further described below through embodiments.

Embodiments 1 to 13

Table 1 gives the glass composition, refractive index (nd), Abbé number (vd), glass-transition temperature (Tg), sag temperature (Ts), liquid-phase temperature (L.T.), specific gravity, and weatherability indexes in the form of the above-described ratio of the intensity of scattered light to the intensity of transmitted light intensity (scattered light intensity/transmitted light intensity) of the glass of each embodiment. Corresponding oxides, hydroxides, carbonates, and nitrates were employed as the starting materials of the various components for each of the glasses. The starting materials were weighed out to yield the compositions shown in Table 1 upon vitrification, intimately mixed, charged to a platinum crucible, melted in an electric furnace within a temperature range of from 1,050 to 1,200° C., homogenized by stirring, clarified, and cast in a metal mold preheated to a suitable temperature. The cast glass was cooled to the glass-transition temperature and then immediately charged to an annealing furnace, where it was gradually cooled to room temperature, yielding optical glass.

The refractive index (nd), Abbé number (vd), glass-transition temperature (Tg), sag temperature (Ts), and liquid-phase temperature (L.T.) of the optical glass obtained were measured as follows.

(1) Refractive index (nd) and Abbé number (vd)

Measured for optical glass obtained at a gradual cooling rate of −30° C./hour.

(2) Glass-transition temperature (Tg) and sag temperature (Ts)

Measured for a temperature increase rate of 4° C./min. with an apparatus for thermomechanical analysis made by Rigaku Denki K.K.

(3) Liquid-phase temperature (L.T.)

The sample was maintained for 1 hour in a devitrification test furnace with a temperature gradient of 400 to 11,150° C., the presence or absence of crystals was observed with a microscope at 80× magnification, and the maximum temperature at which no crystal precipitation was observed was adopted as the liquid-phase temperature.

(4) Ratio of the intensity of scattered light to the intensity of transmitted light intensity (scattered light intensity/transmitted light intensity)

This ratio is given as a percentage.

(5) Specific gravity

Calculated by Archimedes' method.

The Dw of each of the glasses was less than 0.25.

TABLE 1

| | | Composition | | | | | | | |
|---|---|---|---|---|---|---|---|---|---|
| No. | Unit | $P_2O_5$ | BaO | $P_2O_5$/BaO (wt ratio) | MgO | $Li_2O$ | $Na_2O$ | $K_2O$ | $Li_2O + Na_2O + K_2O$ |
| 1 | mol % | 40.74 | 37.04 | — | 7.41 | 3.70 | 0.00 | 0.00 | 3.70 |
|   | wt % | 45.54 | 44.72 | 1.018 | 2.35 | 0.87 | 0.00 | 0.00 | 0.87 |
| 2 | mol % | 40.00 | 36.36 | — | 7.27 | 3.64 | 0.00 | 0.00 | 3.64 |
|   | wt % | 45.48 | 44.66 | 1.018 | 2.35 | 0.87 | 0.00 | 0.00 | 0.87 |

TABLE 1-continued

| No. | Unit | | | | | | | | |
|---|---|---|---|---|---|---|---|---|---|
| 3 | mol % | 40.00 | 36.36 | — | 7.27 | 3.64 | 0.00 | 0.00 | 3.64 |
|   | wt % | 45.14 | 44.33 | 1.018 | 2.33 | 0.86 | 0.00 | 0.00 | 0.86 |
| 4 | mol % | 40.74 | 37.04 | — | 7.41 | 3.70 | 0.00 | 0.00 | 3.70 |
|   | wt % | 45.76 | 44.94 | 1.018 | 2.36 | 0.88 | 0.00 | 0.00 | 0.88 |
| 5 | mol % | 37.74 | 37.74 | — | 3.77 | 7.55 | 0.00 | 0.00 | 7.55 |
|   | wt % | 42.87 | 46.31 | 0.9257 | 1.22 | 1.81 | 0.00 | 0.00 | 1.81 |
| 6 | mol % | 38.89 | 37.04 | — | 7.41 | 5.56 | 0.00 | 0.00 | 5.56 |
|   | wt % | 44.20 | 45.47 | 0.9720 | 2.39 | 1.33 | 0.00 | 0.00 | 1.33 |
| 7 | mol % | 37.31 | 35.82 | — | 7.46 | 7.46 | 0.00 | 0.00 | 7.46 |
|   | wt % | 42.66 | 44.24 | 0.9643 | 2.42 | 1.80 | 0.00 | 0.00 | 1.80 |
| 8 | mol % | 37.17 | 35.69 | — | 7.43 | 7.43 | 0.00 | 0.00 | 7.43 |
|   | wt % | 42.98 | 44.57 | 0.9643 | 2.44 | 1.81 | 0.00 | 0.00 | 1.81 |
| 9 | mol % | 37.88 | 36.36 | — | 7.58 | 7.58 | 0.00 | 0.00 | 7.58 |
|   | wt % | 43.08 | 44.67 | 0.9643 | 2.45 | 1.81 | 0.00 | 0.00 | 1.81 |
| 10 | mol % | 37.31 | 35.82 | — | 3.73 | 7.46 | 0.00 | 0.00 | 7.46 |
|   | wt % | 42.14 | 43.70 | 0.9643 | 1.20 | 1.77 | 0.00 | 0.00 | 1.77 |
| 11 | mol % | 37.59 | 36.09 | — | 7.52 | 6.77 | 0.00 | 0.00 | 6.77 |
|   | wt % | 43.12 | 44.71 | 0.9643 | 2.45 | 1.63 | 0.00 | 0.00 | 1.63 |
| 12 | mol % | 45.63 | 33.46 | — | 3.80 | 1.90 | 0.00 | 0.00 | 1.90 |
|   | wt % | 47.92 | 37.96 | 1.262 | 1.13 | 0.42 | 0.00 | 0.00 | 0.42 |
| 13 | mol % | 36.36 | 36.36 | — | 3.64 | 4.73 | 0.00 | 0.00 | 4.73 |
|   | wt % | 40.67 | 43.93 | 0.926 | 1.15 | 1.11 | 0.00 | 0.00 | 1.11 |

| | | Composition | | | | | | |
|---|---|---|---|---|---|---|---|---|
| No. | Unit | ZnO | $B_2O_3$ | $Al_2O_3$ | $Gd_2O_3$ | CaO | SrO | Total |
| 1 | mol % | 3.70 | 1.85 | 1.85 | 0.00 | 3.70 | 0.00 | 100.00 |
|   | wt % | 2.37 | 1.02 | 1.49 | 0.00 | 1.63 | 0.00 | 100.00 |
| 2 | mol % | 3.64 | 1.82 | 0.00 | 0.00 | 7.27 | 0.00 | 100.00 |
|   | wt % | 2.37 | 1.01 | 0.00 | 0.00 | 3.26 | 0.00 | 100.00 |
| 3 | mol % | 7.27 | 1.82 | 0.00 | 0.00 | 3.64 | 0.00 | 100.00 |
|   | wt % | 4.71 | 1.01 | 0.00 | 0.00 | 1.62 | 0.00 | 100.00 |
| 4 | mol % | 3.70 | 3.70 | 0.00 | 0.00 | 3.70 | 0.00 | 100.00 |
|   | wt % | 2.39 | 2.04 | 0.00 | 0.00 | 1.64 | 0.00 | 100.00 |
| 5 | mol % | 3.77 | 3.77 | 1.89 | 0.00 | 3.77 | 0.00 | 100.00 |
|   | wt % | 2.46 | 2.10 | 1.54 | 0.00 | 1.69 | 0.00 | 100.00 |
| 6 | mol % | 3.70 | 1.85 | 1.85 | 0.00 | 3.70 | 0.00 | 100.00 |
|   | wt % | 2.41 | 1.03 | 1.51 | 0.00 | 1.66 | 0.00 | 100.00 |
| 7 | mol % | 3.73 | 1.87 | 1.87 | 0.75 | 3.73 | 0.00 | 100.00 |
|   | wt % | 2.45 | 1.05 | 1.53 | 2.18 | 1.68 | 0.00 | 100.00 |
| 8 | mol % | 3.72 | 1.86 | 1.86 | 0.37 | 4.46 | 0.00 | 100.00 |
|   | wt % | 2.46 | 1.05 | 1.54 | 1.10 | 2.03 | 0.00 | 100.00 |
| 9 | mol % | 2.27 | 1.89 | 1.89 | 0.76 | 3.79 | 0.00 | 100.00 |
|   | wt % | 1.48 | 1.06 | 1.55 | 2.20 | 1.70 | 0.00 | 100.00 |
| 10 | mol % | 7.46 | 1.87 | 1.87 | 0.75 | 3.73 | 0.00 | 100.00 |
|   | wt % | 4.83 | 1.03 | 1.51 | 2.15 | 1.66 | 0.00 | 100.00 |
| 11 | mol % | 3.76 | 2.26 | 1.88 | 0.38 | 3.76 | 0.00 | 100.00 |
|   | wt % | 2.47 | 1.27 | 1.55 | 1.10 | 1.70 | 0.00 | 100.00 |
| 12 | mol % | 3.04 | 0.00 | 3.80 | 0.76 | 0.00 | 7.60 | 100.00 |
|   | wt % | 1.83 | 0.00 | 2.87 | 2.04 | 0.00 | 5.83 | 100.00 |
| 13 | mol % | 10.91 | 1.82 | 1.82 | 0.73 | 3.64 | 0.00 | 100.00 |
|   | wt % | 7.00 | 1.00 | 1.46 | 2.08 | 1.60 | 0.00 | 100.00 |

| No. | Gravity | Tg (° C.) | Ts (° C.) | nd | vd | LT (° C.) | Weatherability (%) |
|---|---|---|---|---|---|---|---|
| 1 | 3.644 | 483 | 523 | 1.60091 | 64.47 | 850 | 5.5 |
| 2 | 3.638 | 471 | 510 | 1.60119 | 64.22 | 900 | 4.3 |
| 3 | 3.673 | 464 | 503 | 1.6022 | 63.99 | 930 | 3.8 |
| 4 | 3.627 | 452 | 491 | 1.59845 | 64.48 | 850 | 3.5 |
| 5 | 3.704 | 479 | 516 | 1.60812 | 64.01 | 880 | 0.2 |
| 6 | 3.684 | 482 | 521 | 1.60561 | 64.42 | 870 | 0.3 |
| 7 | 3.742 | 485 | 522 | 1.61195 | 64.21 | 880 | 0.3 |
| 8 | 3.719 | 485 | 522 | 1.6106 | 64.13 | 880 | 0.3 |
| 9 | 3.715 | 486 | 522 | 1.60875 | 64.21 | 880 | 0.4 |
| 10 | 3.779 | 473 | 510 | 1.61481 | 63.38 | 870 | 0.3 |
| 11 | 3.705 | 484 | 521 | 1.60822 | 64.22 | 870 | 0.3 |
| 12 | 3.609 | 496 | 539 | 1.59405 | 64.64 | 880 | 2.7 |
| 13 | 3.855 | 494 | 531 | 1.62002 | 63.01 | 900 | 0.2 |

Embodiment 14

Next, clarified and homogenized glass melts corresponding to Embodiments 1 to 13 were made to flow at constant flow rate out of a pipe made of a platinum alloy the temperature of which was adjusted to a temperature range over which stable flowing was possible without devitrification of the glass. The dripping method or the drop-cut method was employed to separate glass melt gobs of the weight of the desired preform, the glass melt gobs were received in receiving molds having glass spray outlets in the bottom portions thereof, gas was blown out through the gas spray outlets, and preforms for press molding were molded while floating the glass gobs. The separation interval of the glass melt was adjusted and set to obtain spherical preforms 2 to 30 mm in diameter. The weight of the preforms was precisely matched to the setting value, and all the preforms had smooth surfaces.

Embodiment 15

The preforms obtained in Embodiment 14 were precision press molded in the pressing device shown in FIG. 1 to obtain aspherical lenses. Specifically, the preform was placed between the lower mold 2 and the upper mold 1 of the pressing mold, the interior of quartz tube 11 was backfilled with a nitrogen atmosphere, and electricity was supplied to heater 12 to heat the interior of quartz tube 11. The temperature within the pressing mold was set to a temperature at which the glass being molded exhibited a viscosity of from $10^8$ to $10^{10}$ dPa·sec, and while maintaining this temperature, pressing rod 13 was dropped to press against upper mold 1, thereby pressing the preform that had been placed within the pressing mold. The pressure applied was 8 MPa and the pressing time was 30 s. Following pressing, the pressure was released and the molded glass article that had been press molded was gradually cooled to a temperature at which the glass exhibited a viscosity of greater than or equal to $10^{12}$ dPa·sec with lower mold 2 and upper mold 1 still in contact. Next, the molded glass article was cooled to room temperature and removed from the pressing mold to obtain an aspherical lens. The aspherical lens obtained had extremely high surface precision. An antireflective film can be provided as needed on aspherical lenses obtained by precision press molding.

Embodiment 16

The preforms obtained in Embodiment 14 were preheated to a temperature at which the glass constituting the preforms exhibited a viscosity of $10^8$ dPa·sec while being floated. A pressing mold comprising an upper mold, lower mold, and drum was separately heated to a temperature at which the glass exhibited a viscosity of from $10^9$ to $10^{12}$ dPa·sec, and the preheated preform was introduced into the cavity of the pressing mold and precision press molded. The pressure applied was 10 MPa. Cooling of the glass and pressing mold was begun at the start of pressing. After cooling to a temperature at which the molded glass exhibited a viscosity of greater than or equal to $10^{12}$ dPa·sec, the molded article was removed from the mold, yielding an aspherical lens. The aspherical lens obtained had extremely high surface precision.

An antireflective film can be provided as needed on aspherical lenses obtained by precision press molding.

The present invention as set forth above provides optical glass having low dispersion, a low glass-transition temperature, and good weatherability.

Further, the present invention utilizes the various characteristics afforded by the above-described optical glass to provide a press molding preform optical elements having desired optical constants and good weatherability. In particular, the low softening property of the optical glass permits press molding at relatively low temperature, thus extending the service life of the pressing mold and permitting stable precision press molding.

Further, the present invention utilizes the various characteristics of the above optical glass to provide a method of manufacturing preforms with smooth surfaces without devitrification. In particular, it is possible to manufacture stable preforms from a melt of glass having a liquid-phase temperature of less than or equal to 1,050° C.

Still further, the present invention provides a high-precision optical element by utilizing the low dispersion characteristic. In addition, it is possible to stably manufacture the optical element by precision press molding with high production efficiency.

The present disclosure relates to the subject matter contained in Japanese Patent Application No. 2003-114017 filed on Apr. 18, 2003, which is expressly incorporated herein by reference in its entirety.

What is claimed is:

1. An optical glass comprising, given as molar percentages,
28 to 50 percent of $P_2O_5$;
more than 20 percent but not more than 50 percent of BaO;
1 to 20 percent MgO;
a sum of $Li_2O$, $Na_2O$, and $K_2O$ exceeding 3 percent (with 0 to 25 percent of $Li_2O$, greater than or equal to 0 percent and less than 10 percent of $Na_2O$, and 0 to 12 percent of $K_2O$);
more than 0 percent but not more than 15 percent of ZnO;
0 to 25 percent of $B_2O_3$;
0 to 5 percent of $Al_2O_3$;
0 to 8 percent of $Gd_2O_3$;
0 to 20 percent of CaO;
0 to 15 percent of SrO; and
0 to 1 percent of $Sb_2O_3$;
with a sum of oxide contents of P, Ba, Mg, Li, Na, K, Zn, B, Al, Gd, Ca, Sr, and Sb being greater than or equal to 98 percent, and
wherein the optical glass contains no $La_2O_3$.

2. The optical glass according to claim 1, wherein a refractive index (nd) of from 1.55 to 1.72 and an Abbé number (vd) of from 57 to 70.

3. A press molding preform comprised of the optical glass according to claim 1.

4. A press molding preform comprised of the optical glass according to claim 2.

5. A method of manufacturing a press molding preform in which a glass melt gob of prescribed weight is separated from a glass melt flow, and a press molding preform comprised of the optical glass according to claim 1 is formed with the prescribed weight.

6. An optical element comprised of the optical glass of claim 1.

7. An optical element comprised of the optical glass of claim 2.

8. A method of manufacturing an optical element in which the press molding preform according to claim 3.

9. The method of manufacturing an optical preform according to claim 8, wherein the preform is introduced into a pressing mold, the pressing mold and preform are both heated, and the preform is precision press molded.

10. The method of manufacturing an optical element according to claim 8, wherein the pressing mold and preform are separately preheated and the preheated preform is introduced into the pressing mold and precision press molded.

11. A method of manufacturing an optical element in which the press molding preform manufactured by the method of manufacturing according to claim 5 is heated and precision press molded.

12. The method of manufacturing an optical preform according to claim 11, wherein the preform is introduced into a pressing mold, the pressing mold and preform are both heated, and the preform is precision press molded.

13. The method of manufacturing an optical element according to claim 11, wherein the pressing mold and preform are separately preheated and the preheated preform is introduced into the pressing mold and precision press molded.

* * * * *